Dec. 13, 1960   J. R. MacINTOSH ET AL   2,963,833
EXPANSIBLE WHEEL AND HUB STRUCTURE
Filed Aug. 6, 1957   2 Sheets-Sheet 1
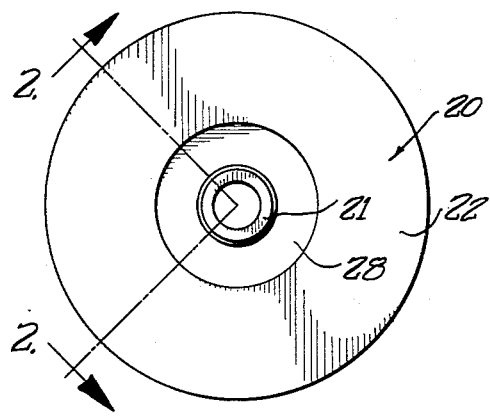
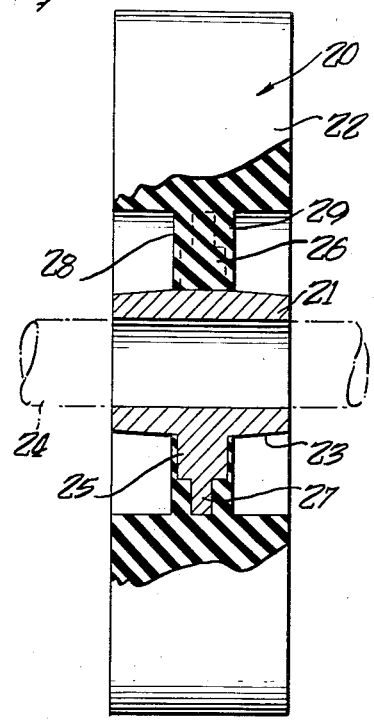
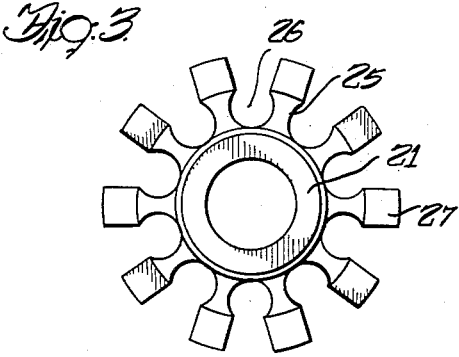
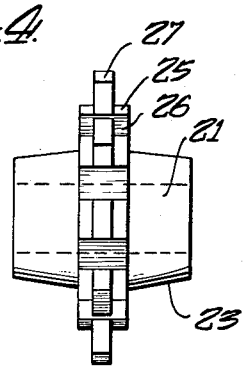
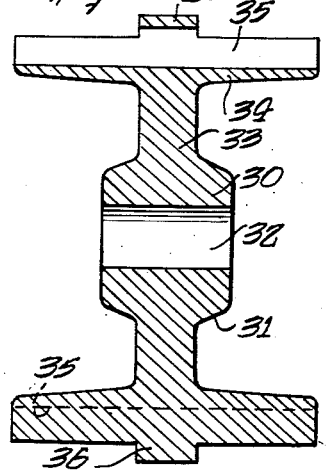
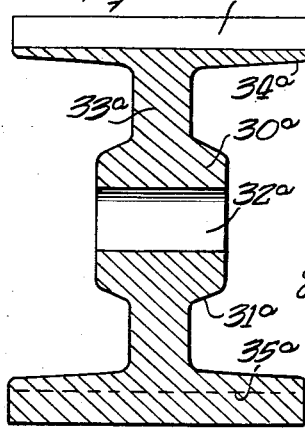
Inventors
John R. MacIntosh
Sam A. Mecurio
John W. Graham
Attorney Dec. 13, 1960 J. R. MacINTOSH ET AL 2,963,833
EXPANSIBLE WHEEL AND HUB STRUCTURE
Filed Aug. 6, 1957 2 Sheets-Sheet 2
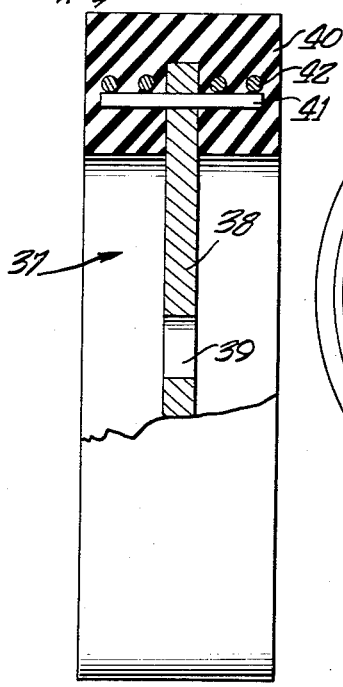
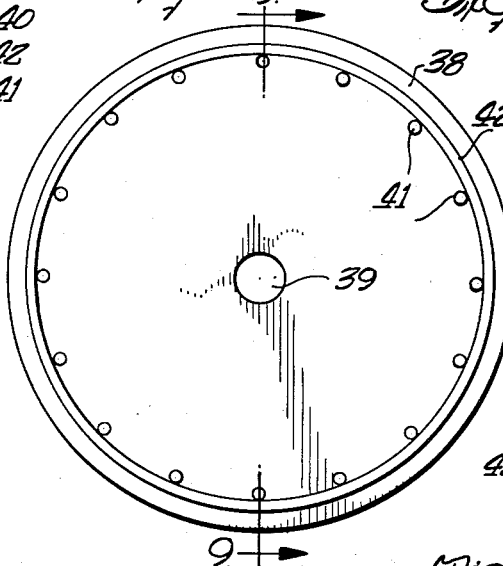
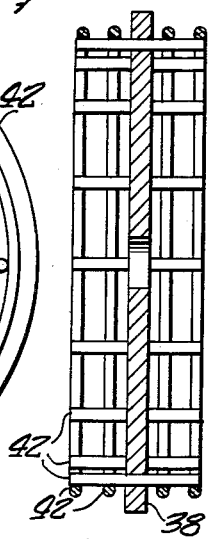
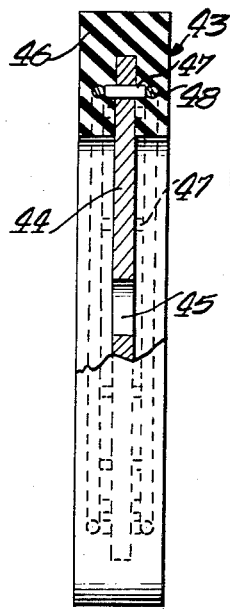
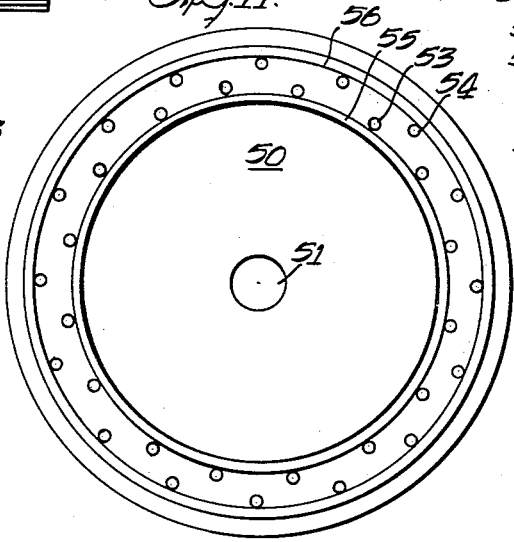
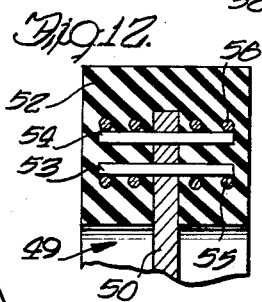
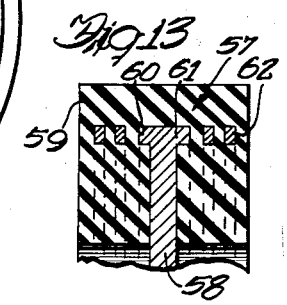
Inventors
John R. MacIntosh
Sam A. Mecurio
John W. Graham
Attorney United States Patent Office 2,963,833
Patented Dec. 13, 1960

2,963,833
EXPANSIBLE WHEEL AND HUB STRUCTURE
John R. MacIntosh and Sam A. Mercurio, Chicago, Ill., assignors to Mermac Products, Inc., Chicago, Ill., a corporation of Illinois
Filed Aug. 6, 1957, Ser. No. 676,603
13 Claims. (Cl. 51—191)

This invention pertains to an expansible wheel and hub structure, and more particularly to an expansible abrasive wheel comprising a relatively rigid hub having an expansible rim anchored thereon.

This application constitutes a continuation-in-part of our copending application, Serial No. 560,981, filed January 24, 1956, now Patent No. 2,801,504.

With expansible wheel structures of the type referred to, and which are disclosed in the above identified patent application, a number of advantages accrue to the users thereof. An important one which has long been appreciated, is the ease with which abrasive belts can be removed and replaced. This advantage is realized because the wheels when at rest have a diameter such that an endless abrasive belt may be easily mounted in circumjacent relation thereon. However, when the wheel is rotated at some predetermined velocity, the wheel (or, more particularly, the rim thereof) expands into tight frictional engagement with the belt to anchor it thereon.

Although many persons in the past have understood this advantage, expansible abrasive wheels have not heretofore been used commercially because the excellence of the work performed thereby was far below the accepted standards established by other abrading systems. An ancillary disadvantage appeared in the relatively short life of the abrasive belts used with such wheels. Further, there has been some reluctance on the part of workmen to use wheels of this character for fear that the expansible rim would tear loose from the hub, and as a consequence cause injury to the workman at hand and, in fact, instances of this have occurred.

We have discovered that the poor quality of the abrading operations performed by expansible wheels heretofore used, has been caused to a large measure by the non-uniform expansion of the rim; and understandably, this same non-uniformity has caused excessive and irregular wear of the belts. We have also discovered that the non-uniformity of the expansion has to a large degree resulted from the type of mounting or anchorage means employed to secure the rim to the hub; and in accordance with this finding, have invented mounting means for structures of this type which overcome this difficulty and which at the same time assure a positive, reliable anchorage of the rim to the hub, and these are primary objects of this invention.

Another object of the invention is to provide an expansible wheel structure comprising a relatively rigid hub and expansible rim therefor, in which a relatively uniform flow of the material forming the rim is permitted under the influence of centrifugal force thereon, by novel mounting means which anchor the rim to the hub. Still another object of the invention is that of providing a wheel structure of the character described, wherein a mounting or anchorage system is used for interlockingly mounting the rim on the hub which permits and requires that the restraining forces (that is, the centripetal forces) holding the rim on the hub, be distributed throughout a substantial volume of the rim which not only facilitates uniform expansion thereof, but obviates localization of such forces which might result in rapid destruction of the rim. Additional objects and advantages of the invention will become apparent as the specification develops.

Embodiments of the invention are illustrated in the accompanying drawings, in which—

Figure 1 is a side view in elevation of an expansible wheel structure embodying the invention; Figure 2 is a vertical sectional view taken along the line 2—2 of Figure 1; Figure 3 is a side view in elevation of the hub used in the structure of Figures 1 and 2; Figure 4 is a view in elevation of the hub illustrated in Figure 3; Figure 5 is a vertical sectional view of a modified type of hub; Figure 6 is a vertical sectional view showing the modified hub illustrated in Figure 5, but with a variation therein; Figure 7 is a view in elevation of a further modified wheel structure embodying the invention, and in which portions are broken away and are shown in section; Figure 8 is a view in elevation of the hub used in the wheel of Figure 7; Figure 9 is a vertical sectional view of the same hub taken along the line 9—9 of Figure 8; Figure 10 is a view in elevation of another modified wheel structure embodying the invention, and in which parts are broken away and are shown in section; Figure 11 is a side view in elevation of a still further modified hub; Figure 12 is a broken vertical sectional view showing the hub of Figure 11 with a rim mounted thereon; and Figure 13 is a broken vertical sectional view showing yet another modified wheel structure.

The expansible wheel structure shown in Figures 1 and 2 is designated generally with the numeral 20, and comprises a hub 21 having an expansible rim 22 mounted thereon. The rim 22 is both expansible and resilient and may be formed of rubber, and will have hardness, resilience and expansibility characteristics which need not be discussed in order to fully disclose and understand the instant invention, and for that reason will not be set forth. The rim 22 is, however, of such character that it will expand to an enlarged diameter when rotated at a predetermined velocity. It is adapted to have an endless abrasive band mounted thereon which has a slightly greater inner diameter than the outer diameter of the rim 22 when the wheel is at rest, to facilitate mounting and removal of the band. However, upon rotation of the wheel, the rim expands into gripping engagement with the band to securely anchor it thereon.

The hub 21 shown in Figures 1 through 4 is a relatively rigid member which may be made of metal, and is enlarged centrally as shown at 23 to define an arbor for receiving a rotatably driven shaft 24. The hub 21 may be constrained on the shaft 24 by any suitable means, such as by clamp collars, by nuts threadedly received on the shaft 24, etc. Extending outwardly from the central enlargement 23 is a flange denoted generally with the numeral 25, and which is centrally disposed with respect thereto. The flange 25 is of lesser thicknses than the length of the arbor 23, and is provided with a plurality of openings or passages 26 extending therethrough which are equally spaced apart along an arc having its center at the rotational axis of the hub. In the specific illustration, as shown in Figure 3 there are ten passages 26. It will be noted that the passages 26 are open along the outer side thereof, and define restricted necks. The flange 25 in effect then, comprises a plurality of radially extending spokes which are spaced from each other by the transverse passages 26.

The flange 25 is equipped with a plurality of extensions or legs 27, one for each of the spokes, and these legs have a lesser width than that of the flange 25 and are centrally disposed with respect thereto. In fabrication of the wheel 20, the rim 22 is molded onto the hub 21; and in such molding operation, the material forming the rim flows into the passages 26 to fill the same as shown in Figure 2, and at the same time the rim forms laminations 28 and 29 which enclose the flange 25 and its projections 27 thereof.

The resilient rim 22 is firmly anchored to the hub 21 because of the presence of rim material within the passages 26 which are integral with the remaining rim portion through the restricted necks of the passages and spaces between adjacent flange extensions or legs 27, and also through the laminations 28 and 29. When the wheel is rotated about the axis of the shaft 24 to cause the rim 22 to expand, the material within the passages 26 in its coactive relation with the wheels (and particularly the restricted necks thereof) positively anchors the rim to the hub. Anchorage is also afforded through the laminations 28 and 29, and because of the bond that occurs between the contiguous surfaces of the hub and rim. The centrifugal forces tending to expand the rim away from the hub are counter-acted, and the resultant counter-active forces are distributed throughout a wide area of the rim from between the radially disposed spokes which comprise the flange 25. Consequently, no excessive localized forces develop which would tend to tear the rim; and since the forces are uniformly disposed and are distributed over a wide rim portion, they do not cause non-uniform expansion of the rim.

The hub 30 illustrated in Figure 5 is generally similar to the hub 21 heretofore described, and has an enlarged central portion 31 having a bore 32 therethrough adapted to receive a rotatably driven shaft. Extending outwardly from the enlargement 31 and centrally disposed with respect thereto, is a flange 33 formed integrally with an enlarged cylinder or shell 34 of substantially greater width than that of the hub enlargement 31, and which is provided with a plurality of spaced apart openings or passages 35 extending therethrough. The passages 35 are generally similar to the passages 26 heretofore described, for in a molding operation wherein the rim is secured to the hub, the rim material fills and becomes embedded within the passages. In this form of the invention, the hub 30 (and more especially, the shell 34 thereof) is equipped with an endless ring 36 which extends over the passages 35.

The resilient expansible rim is securely anchored to the hub 30 because of the body of rim material which is contained within the passages 35, each of which has a restricted neck which prevents withdrawal of the rim material therefrom; and further, because of the disposition of the ring 36 which completely covers over the central portion of the passages 35. Again in this form of the invention, the centripetal or restraining forces are distributed uniformly about the rim mounted on the hub 30 whereby localized force developments are prevented and uniform expansion of the rim encouraged.

The hub illustrated in Figure 6 is identical to that shown in Figure 5, except that the ring 36 has been omitted; and for purposes of identification each of the elements of that hub is denoted with the same numerals used in Figure 5, except that the suffix *a* has been appended thereto.

The modified wheel structure illustrated in Figure 7 is designated generally with the numeral 37, and comprises a hub 38 having a centrally disposed opening 39 therethrough adapted to receive a rotatably driven shaft, and a rim 40 of resilient, expandible material anchored to the hub. The hub 38 is generally in the form of a plate or flange having adjacent the annular periphery thereof a plurality of transversely extending bars or pins 41 pressed therethrough. The bars 41 are arcuately spaced and define a circle located inwardly from the circumferential surface of the hub. The bars are frictionally gripped by the flange within openings provided for the receipt thereof.

It is evident from Figures 7 and 9 that the bars project outwardly on opposite sides of the flange for substantially equal distances. Circumjacent the circle defined by the bars 41 are a plurality of constraining rings 42, there being four in number in the specific wheel structure illustrated, and these are arranged so that two are on each side of the hub flange. The constraining rings are preferably secured to the bars 41 by tack welds.

The outer portion of the central hub flange, the transverse bars 41, and the constraining rings 42 are all embedded in the expansible rim 40, and are bonded thereto during the molding operation wherein the flange is mounted on the hub. It is apparent that both the constraining rings and transverse bars distribute the centripetal forces uniformly throughout the rim 40, thereby preventing localization of such forces. Further, in addition to facilitating uniform expansion by so distributing the centripetal forces, the bars and rings accommodate a uniform flow of material as the rim is expanded during rotation of the wheel to thereby additionally assure uniform rim expansion.

The wheel structure 43 illustrated in Figure 10 is generally similar to the wheel structure 37, and comprises a hub 44 in the form of a plate or flange having a central opening 45 therein for receiving a rotatably driven shaft, and an expansible rim 46. The hub flange 44 is apertured at spaced apart points that define a circle spaced inwardly from the outer circumferential surface thereof, and mounted within each of those apertures is a transversely extending pin 47. Concentric with the circle defined by the pins 47 and of equal radius are constraining rings 48; and in the precise form of the wheel shown in Figure 10, two rings are employed—one on each side of the hub flange 44. Preferably, the rings 48 are in abutting relation with the respective ends of the pins 47, and are welded or otherwise rigidly secured thereto. The outer portion of the hub flange 44, the transverse pins 47, and the constraining rings 48 are all embedded in the expansible rim 46, and function in the same manner as the corresponding elements heretofore described with references to Figures 7 through 9.

A further variation of the wheel structure shown in Figures 7 and 10, is illustrated in Figures 11 and 12 and is denoted generally with the numeral 49. The wheel 49 comprises a hub 50 in the form of a flat plate centrally apertured as shown at 51 to receive a rotatably driven shaft. The hub 50 is equipped with an expansible rim 52, and embedded within this rim is an outer edge portion of the hub and transversely extending pins or bars 53 and 54 and corresponding constraining rings 55 and 56. It will be apparent that the pins or bars 53 are oriented in spaced apart relation and define an inner circular row. Similarly, the pins or bars 54 are spaced apart, and define a circle concentric with the circle formed by the bars 53. All of the bars 53 and 54 are received within openings provided therefor in the hub flange, and are frictionally held in place therein through a press fit.

The bars 53 and 54 extend outwardly for equal distances on opposite sides of the hub flange 50, and the inner constraining rings 55 (and similarly, the outer constraining rings 56) are arranged in pairs, two on each side of the hub flange. The rings 55 are disposed inwardly of the pins 53 and abut the same, while the rings 56 are disposed outwardly of the bars 54 and abut the outer edges thereof. Preferably, the constraining rings are rigidly secured by tack welds or other suitable means to the respective bars 53 and 54.

A further modified wheel structure 57 is illustrated in Figure 13, and it similarly comprises a hub 58 having a resilient, expandible rim 59 mounted thereon. The hub 58 is primarily a flat plate having an aperture (not shown) for use in mounting the wheel structure on a rotatably driven shaft. Along its outer circumferential surface, the hub is equipped with integral laterally extending flanges 60 and 61 that define constraining rings having their centers on the rotational axis of the wheel. Coextensive with the flanges or rings 60 and 61 are additional constraining rings 62, two on each side of the hub. The rings 62 have the same diameter as the rings 60 and 61, and are aligned therewith in spaced apart relation with respect thereto and to each other. The outer portion of the hub, its rings 60 and 61, and the constraining rings 62 are all embedded in the rim 59.

In all forms of the invention disclosed, the means employed for anchoring the expandible rim to the relatively rigid hub is effective to positively accomplish such anchorage. Furthermore, a uniform distribution of the centripetal forces holding the rim to the hub is provided. Consequently, a positive, reliable anchorage between these elements is attained, and force localization or accumulations are avoided so that there is no tendency for the rim to tear itself apart and disintegrate even when used for extremely long periods. As a result, the wheel is a safe structure to operate.

Moreover, a relatively free flow of the expandible material is permitted as the wheel is brought up to its rotational velocity, and since such flow is uniform, the expansion of the rim is likewise uniform from edge to edge thereof. Thus, an abrasive belt mounted upon the wheels is supported uniformly throughout its entire surface, whereby workpieces abraded or polished by the wheels have a high quality finish that exceeds the standards attained by systems heretofore employed for these purposes. Unexpectedly, the belts were found to have useful life spans that far exceeded those of abrasive belts used with different structures.

While in the foregoing specification embodiments of the invention have been set forth in considerable detail for purposes of illustration, it will be apparent to those skilled in the art that numerous changes may be made in those details without departing from the principles and scope of the invention.

We claim:

1. In an expansible wheel structure, a rotatable hub equipped adjacent the peripheral surface thereof with a plurality of spaced apart pins extending outwardly from each side thereof and defining a circle having its center on the rotational axis of said hub, a plurality of constraining rings adjacent said pins and secured thereto, said rings being circular and having their centers on the rotational axis of said hub, and an expansible rim carried by said hub and having said pins and rings embedded therein.

2. The wheel structure of claim 1 in which said rings are circumjacent said pins.

3. The wheel structure of claim 1 in which said pins are circumjacent said rings.

4. The wheel structure of claim 1 in which said rings have substantially the same diameter as the circle defined by said pins and are in abutment with the ends thereof.

5. The wheel structure of claim 1 in which a second circular row of pins are carried by said hub concentric with the circle defined by the aforesaid pins, and in which an additional plurality of constraining rings are provided and are secured to said second row of pins.

6. The wheel structure of claim 5 in which the first mentioned plurality of constraining rings are circumjacent the first row of pins, and in which said second row of pins is circumjacent said second mentioned plurality of constraining rings.

7. In an expansible wheel structure, a hub adapted to be mounted on a rotatably driven shaft for rotation about the longitudinal axis thereof, said hub comprising an annular flange of restricted cross section provided with a plurality of spaced apart passages extending transversely therethrough disposed in an arc defining a circle coaxial with the rotational axis thereof and having restricted necks along the outer side thereof defining open channels, and an expansible rim mounted upon said hub and having portions thereof embedded within said passages, said rim having a restricted cross section adjacent said flange and providing laminations substantially enclosing the side walls thereof.

8. The wheel structure of claim 7 in which said flange is equipped with a plurality of radially disposed flange extensions alternately oriented with respect to said passages.

9. In an expansible wheel structure, a rotatable hub equipped adjacent the peripheral surface thereof with pin members extending outwardly from each side thereof and defining a circle having its center on the rotational axis of said hub, a plurality of constraining rings adjacent said pins, said rings being circular and having their centers on the rotational axis of said hub, and an expansible rim carried by said hub and having said pins and rings embedded therein.

10. The wheel structure of claim 9 in which said hub is equipped adjacent its peripheral surface with a laterally extending flange on each side thereof defining said pin members, and in which said constraining rings are aligned with the respective flanges and are spaced laterally therefrom and from each other.

11. In an expansible wheel structure adapted to have an endless abrasive belt mounted upon the circumferential surface thereof and characterized by having such circumferential surface expand into frictional engagement with such abrasive belt to anchor the same thereon when the wheel structure is rotated at a velocity in excess of a predetermined value, a relatively rigid hub adapted to be mounted upon a shaft and to be rotatably driven about the longitudinal axis thereof, said hub being equipped with an annular flange extending radially therefrom at substantially the center thereof, an expansible rim mounted upon said hub and providing the aforesaid circumferential surface, and means for constraining said expansible rim on said hub so as to enforce rotational movement on the rim when the hub is rotated, said rim having laminations on each side thereof substantially coextensive with said annular flange and overlying the respective faces thereof.

12. In an expansible wheel structure adapted to have an endless abrasive belt mounted upon the circumferential surface thereof and characterized by having such circumferential surface expand into frictional engagement with such abrasive belt to anchor the same thereon when the wheel structure is rotated at a velocity in excess of a predetermined value, a relatively rigid hub adapted to be mounted upon a shaft and to be rotatably driven about the longitudinal axis thereof, said hub being equipped with an annular flange extending radially therefrom at substantially the center thereof, said flange having a plurality of arcuately spaced openings formed therein each of which extends radially inwardly from the outer edge of said flange toward adjacency with said hub and each of said openings having a restricted neck intermediate the radially spaced ends thereof, and an expansible rim mounted upon said hub and providing the aforesaid circumferential surface, said flange being embedded in said rim and said rim having portions thereof disposed within each of said openings and substantially filling the same, whereby each of said restricted necks exerts centripetal forces upon said rim when said hub is rotated to expand said rim so as to frictionally engage such an endless abrasive belt mounted thereon.

13. The wheel structure of claim 12 in which an annular ring is disposed circumjacent said flange and is secured thereto intermediate said openings.

References Cited in the file of this patent

UNITED STATES PATENTS 2,639,560    Cosmos    May 26, 1953
2,700,257    Landass    Jan. 25, 1955